W. M. RYAN.
Post-Hole Diggers.

No. 158,609. Patented Jan. 12, 1875.

Witnesses:
T. J. Price
G. D. Price

Inventor
Wm. M. Ryan

UNITED STATES PATENT OFFICE.

WILLIAM M. RYAN, OF MACOMB, ILLINOIS, ASSIGNOR OF ONE-HALF HIS RIGHT TO WILLIAM M. LIPE AND JOHN B. SIMPSON, OF SAME PLACE.

IMPROVEMENT IN POST-HOLE DIGGERS.

Specification forming part of Letters Patent No. 158,609, dated January 12, 1875; application filed May 21, 1874.

*To all whom it may concern:*

Be it known that I, WILLIAM M. RYAN, of Macomb, in the county of McDonough and State of Illinois, have invented a new and useful Improvement in Post-Hole Diggers; and I do hereby declare that the following is a full and exact description of the same, reference being had to the accompanying drawing, and to the letters of reference marked thereon.

The object of this invention is the construction of a device whereby an implement for digging post-holes can be unloaded and cleaned; and its novelty consists in arranging a plunger, which is attached to rods, and is operated with a lever.

Figure 1:
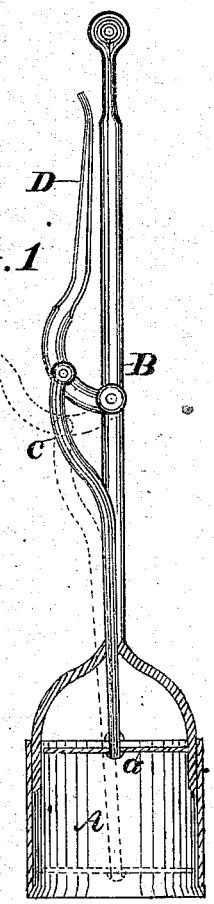
Figure 2:
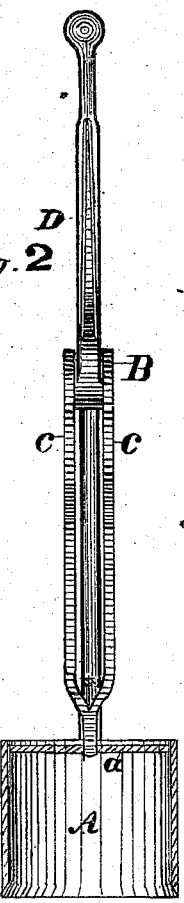

In the drawing, Figures 1 and 2, A represents a section of a cylinder, which can be constructed either round or square, to which is firmly attached the handle B. D is a lever, which is pivoted to the handle B. C represents rods, which are pivoted to each side of the lever D, shown in Fig. 2. These rods are united at the lower end, and are firmly attached to the head $a$, which is loosely fitted to the inside of the cylinder A.

The operation is as follows: The operator takes hold of the handle B, just above the end of the lever D, with one hand; with the other hand he grasps both the handle and lever; then at the proper place for a post-hole he strikes the digger into the ground. The digger is then drawn out, bringing with it all the earth to the depth that the cylinder had penetrated, the earth being pressed firmly inside of the cylinder. The digger is then held across the operator's thigh, and the lever D is then thrown out, as shown in dotted lines, and, by means of the rods $c$ and head $a$, the earth is all pushed out of the cylinder. The operation is then repeated until the post-hole is of sufficient depth.

I am aware that implements for digging post-holes have been constructed with devices for cleaning, consisting of jointed levers, with a plunger-rod working inside of the handle; but I am not aware that any device for the same purpose has previously been used, consisting of two rods united at the lower end, and attached to the plunger working at the side of the handle, by means of a bent lever, as fully shown in the drawings.

Having thus fully described my invention, what I claim as new, and desire to secure by Letters Patent, is—

In a post-hole digger, in combination, the cylinder A, handle B, connecting-rods $c$ $c$, plunger $a$, and lever D, all arranged as specified.

WILLIAM M. RYAN.

Witnesses:
 THOS. J. PRICE,
 D. G. PRICE.